May 30, 1967     T. E. BJORN     3,321,960
VIBRATION DETECTION GAUGE
Filed July 10, 1964
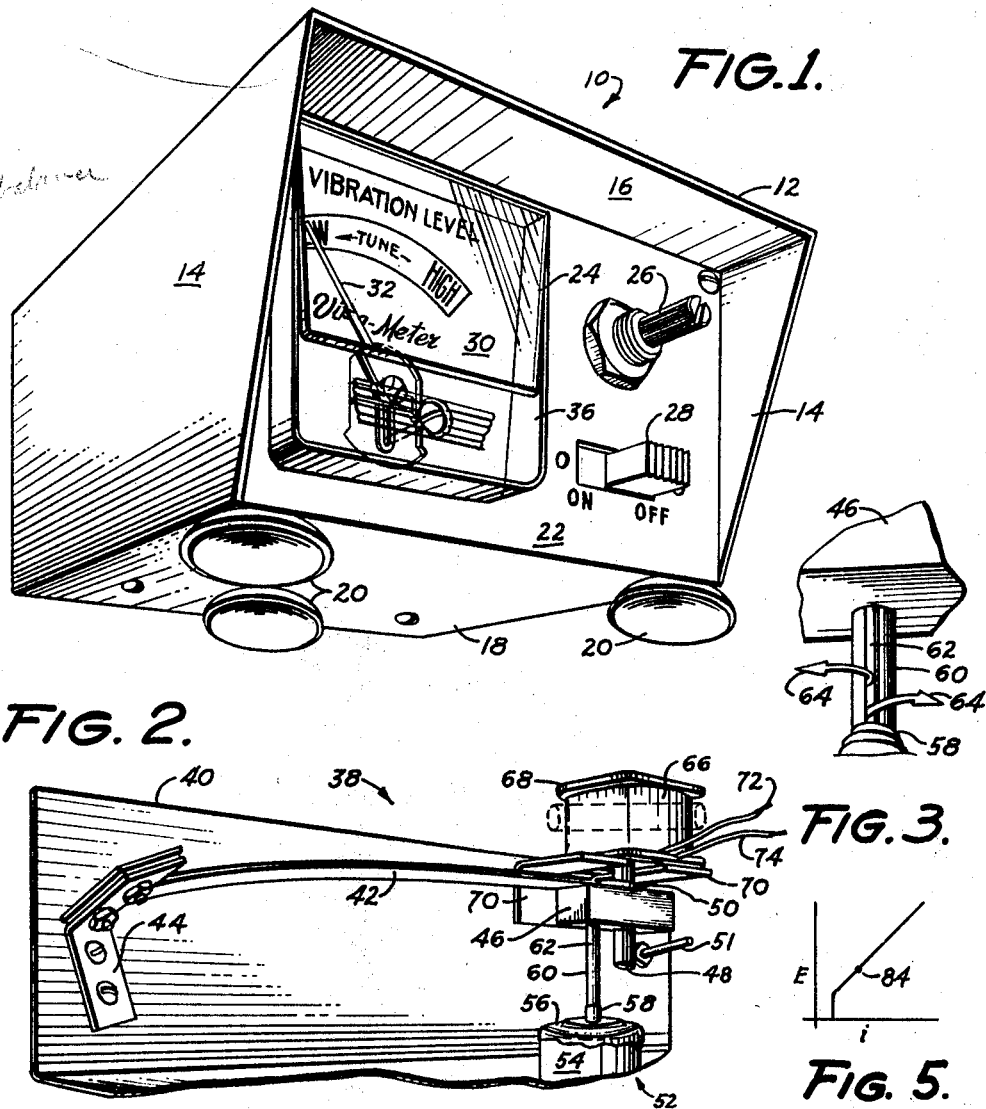
INVENTOR
Thomas E. Bjorn
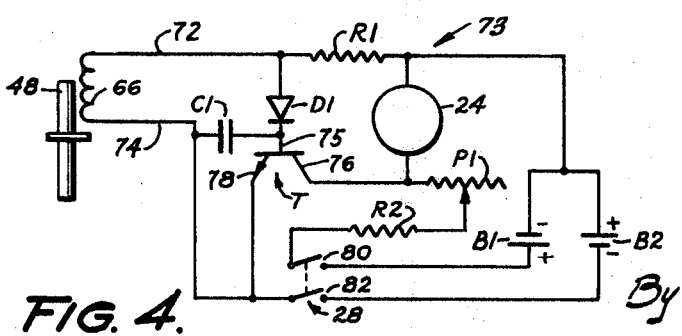
By Norton Lesser
Attorney United States Patent Office 3,321,960
Patented May 30, 1967

3,321,960
VIBRATION DETECTION GAUGE
Thomas E. Bjorn, Northbrook, Ill., assignor to Stewart-Warner Corporation, Chicago, Ill., a corporation of Virginia
Filed July 10, 1964, Ser. No. 381,665
8 Claims. (Cl. 73—71.4)

ABSTRACT OF THE DISCLOSURE

The disclosure of this application relates to apparatus for detecting wheel unbalance and includes a vibratory element for responding to vibrations induced by the wheel unbalance. A magnet carried by the element controls a transistorized circuit for indicating the degree of unbalance. A pneumatic damping device is provided for preventing excessive amplitudes in the movement of the vibratory element and magnet.

The present invention relates in general to vibration detection gauges and more particularly to an improved arrangement for detecting the degree of unbalance in a rotating member such as an automobile wheel.

Service stations and garage repair shops and the like require simplified economical wheel balancing apparatus both for improving accuracy in balancing and for reducing time consuming manual labor. One type of such apparatus is disclosed in Service Instructions for Models 7061–A and 7062–A Mechanical Wheel Balancers, printed in the U.S.A. by Alemite Division, Stewart-Warner Corporation, dated March 1964. Such apparatus may include a pair of rotatable weights which are mounted on the wheel and rotated relative to the wheel and to each other while the wheel is in rotation for the purpose of locating an optimum position at which the weights balance the wheel. In order to ascertain when the weights are properly positioned for optimum balance a suitable gauge or vibration detection apparatus should be employed by the mechanic or operator as he rotates the weights relative to the wheel. Such a gauge comprises a pick up or sensing device coupled usually to complex electronic circuitry for controlling a meter that indicates the relative degree of vibration of the wheel as the weights are adjusted. When the meter indicates a null corresponding to a minimum of vibration, the operator knows that the wheel is properly balanced.

The gauge as stated usually comprises complex electronic circuitry utilizing vacuum tubes and requiring expensive complicated power supplies. It is desirable to simplify such circuitry and now that semiconductor devices have become available at economical prices, it is also desirable to substitute such semiconductor devices for the vacuum tubes. Such substitution, however, cannot be a single replacement to secure the same functions since there is, for example, the difficulty in providing a linear response over the desired operating range.

As previously mentioned, the gauge also includes a pick up device. This device must be comparatively inertialess so that it closely follows the vibrations of the wheel, but at the same time cannot be permitted to respond indiscriminately to ambient vibrations or to oscillate at excessive amplitudes. An air damping assembly is, therefore, connected to the pick up device for damping such ambient vibrations and for reducing the excursions of the pick up device to wheel vibrations. The air damping assembly includes an orifice for inhaling and exhaling air and its location relative to the connection to the pick up device presents certain problems due to the limited space and necessarily economical construction of the assembly. Alternatively, or in conjunction with the air damping assembly, a simple non-magnetic sleeve may be utilized on the coil associated with the pick up device for the same purpose.

It is therefore one object of the present invention to provide an improved and more economical arrangement for detecting vibrations in a rotating automobile wheel.

It is a further object of this invention to provide improved and more economical circuitry for use in detecting vibrations of a rotating element.

It is another object of this invention to provide a circuit utilizing a semiconductor device adapted to respond in a relatively linear fashion to changes in vibratory impulses supplied thereto from a rotating automobile wheel.

It is still another object of the present invention to provide an improved damping arrangement for the pick up device of a vibration detection gauge.

It is still another object of this invention to provide an improved arrangement for connecting the sensing element of a vibration detection gauge to an air damping assembly.

The objects of the invention are accomplished in a relatively simple and ingenious manner. Thus, the gauge utilizing the principles of the present invention employs a transistor whose base circuit is biased in a conducting direction through a diode. The bias is of a magnitude sufficient to ensure that the normal signal changes across the diode do not fall below the knee of the conducting characteristic of the diode. The transistor is thus maintained conductive over a substantially linear range in response to signal changes applied thereto through the diode.

A simple approach is also utilized for achieving improved and more economical damping of the pick up device. This is done through use of an air dash pot and/or a copper sleeve on the coil associated with the pick up device. A unique connection between the sensing device and the air damping assembly is also provided with the connection serving as an orifice or passageway for air movement. Thus, a simple roll pin is used to connect the diaphragm of the damping assembly to the sensing element with the roll pin connecting directly to an aperture in the diaphragm so that air passage through the diaphragm into the chamber occurs through the connecting link to the sensing device.

Other objects and features of this invention will become apparent on examination of the following specification and claims, together with the accompanying drawings wherein:

FIGURE 1 is a perspective view of a vibration detection gauge employing the principles of the present invention for use in detecting changes in vibration level of a rotating automobile wheel;

FIGURE 2 is a perspective view of the vibration sensing assembly;

FIGURE 3 is a perspective view of the roll pin and adjacent apparatus illustrating in greater detail the connection between the sensing element and the damping assembly;

FIGURE 4 is a circuit diagram illustrating the circuitry incorporating the principles of the present invention; and FIGURE 5 is a graph illustrating how the conductive characteristics of a diode are employed for achieving the advantages of the invention.

Referring now to FIGURE 1, a vibration detection gauge is indicated generally by the reference character 10. It comprises a chassis or housing 12 having side walls 14, a top wall 16 and a bottom wall 18. A plurality of spaced apart suction cups 20 are mounted on the bottom wall 18 for the purpose of permitting the assembly to be securely carried, for example, on the fender of an automobile.

The chassis 12 also has a front wall or panel 22 on which a meter 24 may be seen. A potentiometer adjustment knob 26 and a switch 28 are also located on the panel 22 for facile access. The meter 24 is of an economical design having a dial plate 30 calibrated with indicia including Low, Tune and High respectively. A needle 32 is adapted to be moved to a position adjacent any of the respective indicia for indicating relative vibration levels when the gauge is in use. The normal rest position of the needle 32 may be suitably adjusted by means of a screw 34 accessible through an opening provided in a transparent face plate 36 of the meter.

A sensing assembly 38 seen in FIGURE 2 is carried on a bracket 40 located within the chassis 12. The assembly 38 comprises a cantilever spring 42 fixedly suspended at one end from an L-shaped support 44 carried by bracket 40. The other end of the spring 42 carries a brass or nonmagnetic weight 46 and a cylindrical permanent magnet 48 extends through the weight 46 with the longitudinal axis of the magnet aligned vertically. A brass or nonmagnetic ring 50 is mounted about the magnet 48 adjacent the weight 46 and sandwiches the spring 42 between itself and weight 46. A stop 51 is provided on the bracket 40 to limit the downward movement of the weight 46, spring 42, and the magnet 48.

With the structure so far described, the spring 42 would respond to extraneous or ambient forces and oscillate undersirably. To prevent this situation an air dash pot or air damping assembly 52 is provided directly below the weight 46. The air damping assembly 52 comprises a cylindrical member 54 suitably carried on bracket 40 and defining a conventional air chamber having a flexible top diaphragm 56. The diaphragm 56 is corrugated and provides only slight resistance to impulses. It has an apertured slight projection 58 adapted to receive one end of a roll pin 60.

The roll pin 60 is simply a sheet metal member rolled in a cylindrical shape with a longitudinal gap between its vertical ends to define a slot 62. The slot 62 serves as an orifice or passageway for the air damping assembly to permit the inhaling and exhaling of air from the air chamber as indicated by the arrows 64 in FIGURE 3.

The use of a roll pin 60 permits extremely facile engagement or connection between the weight 46 and the air damping assembly 52 so that the air damping assembly may perform its function. Thus, the roll pin 60 is simply press fit into a suitable aperture in the lower wall of weight 46. The other end of the pin 60 is then simply inserted in the apertured projection 58 or may be first inserted in the projection and then in the weight.

The magnet 48 projects well above the level of the ring 50 into an air core defined by a coil 66. The coil 66 is wound on a bobbin 68 which is carried by a support 70 on the bracket 40. If desired, a copper sleeve shown by broken lines and indicated by the reference character 71 may be engaged about the coil 66 for the same purposes as dash pot 52 or supplementary thereto. Leads 72 and 74 extending from the coil 66 permit electrical connections to be established thereto.

The interaction of the magnet 48 and coil 66 is detected by means of a circuit arrangement 73 illustrated in FIGURE 4. The circuit arrangement 73 comprises an NPN transistor T having a base circuit 75, a collector circuit 76 and an emitter circuit 78. The transistor may, for example, be a 2N1302 and its base circuit 75 is connected through a diode D1 to lead 72 from the coil 66. The base circuit 75 is also connected to one electrode of a capacitor C1. The other electrode of capacitor C1 is connected to the lead 74 extending from coil 66. The lead 72 is connected through a resistance R1 of approximately 12K to the juncture of the positive terminal of a 1½ volt battery B1 and the negative terminal of a 1½ volt battery B2.

The positive terminal of battery B1 is also connected through the coil of the meter 24 to the collector circuit 76 of the transistor T. The collector circuit 76 is also connected through the resistance of a potentiometer P1 whose resistance is adapted to be varied between 0 and 25K by knob 26 and through a resistor R2 of approximately 470 ohms to one set of normally open contacts 80 of switch 28. The contacts 80 are adapted to connect the positive terminal of battery B1 to the collector circuit 76 through the resistance of resistor R2 and potentiometer P1.

The negative terminal of battery B2 is adapted to be connected through another set of normally open contacts 82 on switch 28 to the emitter circuit 78 of the transistor T and lead 74 from coil 66. Since the coil 66 may have a resistance approximating 15K and the voltage of the 1½ volt battery B2 appears across the coil 66 and resistor R1, which is about 12K, the bias applied through the diode D1 to the base circuit 75 is positive with respect to the emitter and well above the knee of the conducting characteristic of the diode. The capacitor C1 which is connected between the lead 74 and the base 75 serves to integrate signals from the coil 66 applied through diode D1 to the base circuit 75. The capacitor C1, thus, serves to minimize signal ripple and primarily applies the changes in signal amplitude to the base circuit 75.

In operation the gauge 10 is placed, for example, on the fender of an automobile above the wheel to be tested for unbalance. The suction cups 20 hold the chassis 12 in firm contact with the fender without unnecessary damping of the vibrational impulses.

The switch 28 is operated to close contacts 80 and 82. With contacts 80 closed, a positive potential is applied through resistor R2 and potentiometer P1 to the collector circuit 76 and to one terminal of the coil of meter 24. The meter coil is approximately 800 ohms and its other terminal is connected to the batteries B1 and B2 so that the other terminal is at least 1½ volts negative with respect to the potential applied to resistor R2. The greater proportion of the voltage drop occurs across resistor R2 and potentiometer P1. The meter, therefore, conducts at a rate dependent on the potential at the collector circuit of transistor T.

Contacts 82 close to connect the negative terminal of battery B2 to the emitter circuit 78 of transistor T and to one side of coil 66 through lead 74. Current, therefore, flows through coil 66 and resistor R1 and with the chosen values, the potential transmitted through the diode D1 serves to bias the transistor T in the conducting direction. The level of the bias potential is indicated by point 84 in FIGURE 5 which shows the graph of the conduction characteristic of the diode D1 in which point 84 lies well above the knee of the curve. With this arrangement the transistor T conducts in a range lying between saturation and cut off through the meter 24 with the potentiometer P1 and resistor R2 adapted to by pass a portion of the current from the meter. Adjustment of the potentiometer P1 through knob 26, therefore, offers a comparatively simple effective means to both null and zero meter 24 in order to compensate for ambient factors.

Thereafter as the wheel is rotated, the unbalance therein causes the car fender to follow the generated vibrations to in turn vibrate the chassis 12 with respect to the free end of spring 42. The weight 46 and the magnet 48, therefore, move reciprocably with respect to the coil 66. The air damping assembly 52 serves to compress the excursions of magnet 48 in order to ensure that the amplitude of its movement does not extend beyond desired limits.

As the magnet 48 moves relative to the coil 66, signal impulses are generated across the coil with an amplitude related to the amplitude of the vibrations. These signals appear across the diode D1 to charge the capacitor C1. The RC time constant of the base emitter circuit of transistor T is sufficiently low to enable the capacitor C1 to discharge towards the bias level point 84 between pulses without reaching the bias level thereby permitting the emitter collector current to follow the signal changes at the base circuit 75 and since these will vary above point 84, the diode D1 will conduct largely over the linear portion of its characteristic. The emitter collector circuit of transistor T will follow so that the voltage at collector 76 will accurately reflect the vibration amplitudes.

Thus, as large signal amplitudes appear at the base circuit 75 corresponding to large vibrational impulses, the base circuit of transistor T1 will become increasingly positive thereby causing the collector circuit of transistor T1 to swing towards the negative potential of battery B2 so that the meter needle swings towards the High indicia on the dial plate.

As the balance of the wheel is improved through adjustment of the weights, the vibrational impulses are of smaller magnitude and the base circuit of transistor T approaches its normal bias condition. The transistor T, therefore, conducts less heavily and its collector circuit 76 swings towards the positive potential supplied from battery B2. The meter 24, therefore, draws less current and the meter needle 32 falls through Tune towards the Low indicia on the dial plate. When the meter needle 32 has fallen to a null or Low position, the operator knows the wheel balancing operation is complete.

The foregoing constitutes a description of an improved vibration detection gauge whose inventive concepts are believed set forth in the accompanying claims.

What is claimed is:

1. A vibration detection gauge having a signal pick up device for detecting vibrations and a meter for indicating the relative levels in vibration of a rotating automobile wheel, the improvement comprising a semiconductor having a control electrode, a diode connected between one terminal of said pick up device and said control electrode with said diode adapted to pass signals of only one polarity to said control electrode, and means for biasing said diode at a potential above the knee of the conductance characteristic curve of said diode with said biasing means including a portion of said signal pickup device for superimposing said signals on said bias potential whereby the application of said bias potential and signals through said diode to said control electrode enables said semiconductor to control said meter in a relatively linear manner in response to signals from said device.

2. A vibration detection gauge of the type having a signal pick up device for including a coil for generating signals corresponding to vibrations in a rotating automobile wheel and an amplifying device for amplifying said signals in order to control a meter to indicate the level of said signals, the improvement comprising a unidirectional circuit element through which said signals are applied to said amplifying device, and means including said coil for maintaining the potential and said signals applied through said unidirectional element to said amplifying device above the knee of the conductance characteristic of said element whenever said signals are applied thereto.

3. A vibration detection gauge for use in detecting the relative levels in vibration of a rotating automobile wheel, the improvement comprising a transistor having a base circuit, a collector circuit and an emitter circuit, a sensing coil having one terminal connected to said emitter circuit and adapted to generate signals in response to the vibrations of said wheel, a diode connected between the other terminal of said coil and said base circuit with said diode adapted to pass signals of only one polarity appearing across said coil to said base circuit, a capacitor connected between said base and emitter circuit for integrating signals across said sensing coil, and means connected to the other terminal of said coil and to said diode for applying a bias potential with said signals superimposed thereon to said base circuit through said diode with said bias potential being above the knee of the conductance characteristic of said diode and said signals being superimposed on said bias potential.

4. A vibration detection gauge for use in detecting the relative levels in vibration of a rotating automobile wheel, the improvement comprising a transistor having a base circuit, a collector circuit and an emitter circuit, a sensing coil having one terminal connected to said emitter circuit and adapted to generate signals in response to the vibrations of said wheel, a diode connected between the other terminal of said coil and said base circuit with said diode adapted to pass signals of only one polarity appearing across said coil to said base circuit, a capacitor connected between said base and emitter circuit for integrating signals across said sensing coil, means for applying a bias potential to said base circuit through said diode with said bias potential being above the knee of the conductance characteristic of said diode, a permanent magnet suspended adjacent said sensing coil and movably related to said sensing coil for generating signals therein in response to the vibration impulses generated by a rotating automobile wheel, an air damping chamber having a diaphragm, and a roll pin defining an elongated slot for connecting said weight with said chamber through said diaphragm whereby the relative movement of said magnet and weight is damped while said slot provides an air passage through said diaphragm.

5. A vibration detection gauge for use in detecting the relative levels in vibration of a rotating automobile wheel, the improvement comprising a meter, a transistor having a base circuit, a collector circuit and an emitter circuit, a sensing coil adapted to generate signals in response to the vibration of said rotating wheel, a diode connected between one terminal of said coil and said base circuit with said diode adapted to pass signals of only one polarity to said base circuit, a capacitor connected between said base and emitter circuits with said emitter circuit being connected to the other terminal of said coil, and adjustable resistance having one terminal connected to said collector circuit in common with one terminal of said meter, a source of potential for extending potentials to said emitter and collector circuits in a conductive direction, and a resistor interconnecting said one terminal of said sensing coil with said source to provide a potential intermediate said extended potentials to said diode and to the other terminal of said meter, whereby said diode is biased in a conductive direction by an amount above the knee of its conductance characteristic to enable said transistor to conduct at an initially moderate level while the signals passed through said diode to said base circuit in response to vibrations generated by said wheel to enable said transistor to conduct at a rate above said moderate level.

6. A vibration detection gauge for use in detecting the relative levels in vibration of a rotating automobile wheel, the improvement comprising a meter, a transistor having a base circuit, a collector circuit and an emitter circuit, a sensing coil adapted to generate signals in response to the vibration of said rotating wheel, a diode connected between one terminal of said coil and said base circuit with said diode adapted to pass signals of only one polarity to said base circuit, a capacitor connected between said base and emitter circuits with said emitter circuit being connected to the other terminal of said coil, an adjustable resistance having one terminal connected to said collector circuit in common with one terminal of said meter, a source of potential, a normally open switch adapted to connect said emitter circuit and the other terminal of said resistor of said source for extending potentials to said emitter and collector circuits in a conductive direction, and a resistor interconnecting said one terminal of said sensing coil with said source to provide a potential intermediate said extended potentials to said other terminal of said meter and to said diode, whereby said diode is biased in a conductive direction by an amount above the knee of its conductance characteristic to enable said transistor to conduct at an initially moderate level and permit the adjustment of said adjustable resistor to govern the potential at said collector circuit and across said meter for zeroing said meter.

7. A vibration detection gauge for detecting vibrations in a rotating automobile wheel, the improvement comprising a cantilever spring having a weight and permanent magnet carried on the free end thereof for movement relative to a coil for generating signals across said coil in correspondence with the amplitude of received vibrations, an air damping assembly comprising a flexible diaphragm of slight resistance to flexure with an apertured projection thereon to permit the passage of air into and out of said damping assembly, and a member for insertion in said apertured projection and in said weight for connecting the weight and magnet to said diaphragm and having a slot therein to permit the passage of air through said projection into said chamber.

8. A vibration detection gauge in which a cantilever spring having a weight and permanent magnet carried on the free end thereof for movement relative a pick up device for generating signals across said device in correspondence with the amplitude of received vibrations is adapted to be connected to an air damping assembly having a flexible diaphragm with an apertured projection thereon to permit the passage of air into and out of said damping assembly, the improvement comprising a connecting member adapted to be inserted in said apertured projection and in said weight for connecting the weight and magnet to said diaphragm and having an opening therein for communication with the chamber of said assembly through said apertured projection to permit the passage of air through said projection into said chamber.

References Cited

UNITED STATES PATENTS

| | | | |
|---|---|---|---|
| 2,288,399 | 6/1942 | Hoare et al. | 324—119 |
| 2,359,245 | 9/1944 | Ritzmann | 73—71.2 |
| 2,764,019 | 9/1956 | Lindholm et al. | 73—71.2 |
| 2,974,754 | 3/1961 | Landbrecht | 188—94 X |
| 3,059,218 | 10/1962 | Baker | 73—516 X |
| 3,098,379 | 7/1963 | Crawford | 73—71.4 X |

RICHARD C. QUEISSER, *Primary Examiner.*

JAMES J. GILL, *Assistant Examiner.*

UNITED STATES PATENT OFFICE
CERTIFICATE OF CORRECTION

Patent No. 3,321,960                      May 30, 1967

Thomas E. Bjorn

It is hereby certified that error appears in the above numbered patent requiring correction and that the said Letters Patent should read as corrected below.

Column 5, line 42, strike out "for", first occurrence; column 6, line 61, for "of" read -- to --.

Signed and sealed this 2nd day of January 1968.

(SEAL)
Attest:

Edward M. Fletcher, Jr.                          EDWARD J. BRENNER
Attesting Officer                              Commissioner of Patents